United States Patent [19]
Quirk

[11] 4,091,139
[45] May 23, 1978

[54] SEMICONDUCTOR BINDING TAPE AND AN ELECTRICAL MEMBER WRAPPED THEREWITH

[75] Inventor: James F. Quirk, Wilkins Township, Allegheny County, Pa.

[73] Assignee: Westinghouse Electric Corp., Pittsburgh, Pa.

[21] Appl. No.: 614,716

[22] Filed: Sep. 17, 1975

[51] Int. Cl.[2] H01B 7/02; B32B 5/16

[52] U.S. Cl. 428/244; 174/120 SC; 428/247; 428/255; 428/278; 428/324

[58] Field of Search 428/244, 247, 252, 255, 428/268, 273, 278, 324, 372; 174/102 SC, 105 SC, 106 SC, 120 SC

[56] References Cited

U.S. PATENT DOCUMENTS

| | | | |
|---|---|---|---|
| Re. 25,213 | 7/1962 | Runk et al. | 260/20 |
| 2,754,352 | 7/1956 | Connell | 174/102 SC |
| 2,977,333 | 3/1961 | Runk et al. | 260/20 |
| 3,026,222 | 3/1962 | Rogers, Jr. et al. | 428/324 |
| 3,556,925 | 1/1971 | Mertens | 428/324 |
| 3,586,557 | 6/1971 | Rogers | 428/268 |
| 3,647,611 | 3/1972 | Mertens | 428/324 |
| 3,695,984 | 10/1972 | Rogers, Jr. | 428/324 |
| 3,735,025 | 5/1973 | Ling et al. | 174/105 SC |
| 3,780,206 | 12/1973 | Reynolds | 174/105 SC |
| 3,867,245 | 2/1975 | Herman | 428/324 |
| 3,868,613 | 2/1975 | Rogers, Jr. et al. | 428/324 |

*Primary Examiner*—William R. Dixon, Jr.
*Attorney, Agent, or Firm*—D. P. Cillo

[57] ABSTRACT

An insulated electrical member is made comprising at least one conductor wrapped with mica insulation and covered with a semiconducting binding tape, the whole being impregnated with a curable epoxy-styrene resin; where the binding tape comprises a porous, open weave substrate of electrically semiconducting fibrous strands, each fibrous strand being substantially permeated with a filled, thermosettable, protective varnish composition, the varnish composition containing between about 15 to 45 weight percent of electrically contacting carbon particles having a total internal and external surface area of up to about 600 square meters/gram, uniformly distributed therethrough, the interior of the carbon being substantially free of the varnish and resin, to provide fibrous strands that will conduct electricity.

3 Claims, 4 Drawing Figures

U. S. Patent May 23, 1978 4,091,139

SEMICONDUCTOR BINDING TAPE AND AN ELECTRICAL MEMBER WRAPPED THEREWITH

BACKGROUND OF THE INVENTION

In building electrical motors and generators, insulated coils to be employed therein comprise slot portions and end portions. The slot portions fit into the radial slots disposed about the magnetic core of the rotor or stator of the electrical machine, for example an A.C. motor. A particularly satisfactory insulation for such coils comprises a mica tape, wrapped with an electrically semiconducting binding tape, both tapes being impregnated with an epoxy-styrene impregnating resin.

It is highly desirable that the binding tape, covering the mica tape, have the ability to conduct electricity, and so reduce the possibility of corona discharge between the surface of the mica tape and the radial slot of the electrical machine. In the past, filled, fibrous, semiconducting, acrylonitrile latex binding tapes have been used. This tape was effective to allow epoxy-styrene resin impregnation and curing without excessive thermal or physical degradation of the tape.

The semiconducting acrylonitrile latex tape provided a resistivity value of about 120,000 ohms/sq., after impregnation and 8 hours postcure of the epoxy-styrene impregnating resin at 150° C. Such values are low enough to provide an adequate semiconducting surface that will prevent corona discharge. However, consistent uniformity in the manufacture of these tapes had been lacking. As a result resistivity values sometimes were beyond acceptable limits. Such binding tape is no longer marketed and so there is a need for suitable replacements. There is also a need for binding tapes providing lower resistivity values after varnish impregnation and cure.

SUMMARY OF THE INVENTION

It has been found, that an open weave substrate of, for example, glass or fabric cloth, the strands of which contain a carbon filled, thermosetting varnish, which effectively resists degradation by styrene, which is a potent solvent, can be used as the semiconducting binding tape for mica insulated conductors.

The open weave substrate preferably should have a thread count of between about 40 to 90 threads/inch in the fill and warp direction. The filled varnish content should preferably be between about 15 to 40 weight percent, based on filled cured varnish plus open weave substrate weight. The carbon particle filler content must be between about 15 to 45 weight percent based on filler plus varnish solids weight. The carbon particles must have a total internal and external surface area of below about 600 square meters/gram. The resinous varnish used to protect the conducting, electrically contacting carbon particles and coat the fibers of the open weave substrate, to provide a porous, semiconducting binding tape, must be of the thermoset type. The varnish is preferably a modified alkyd composition, such as an oil modified heat reactive phenolic medium oil modified alkyd composition, which is not seriously degraded by subsequently impregnated epoxy-styrene resin at curing temperatures of between about 150° to 250° C.

The binding tape, after coating with the carbon filled thermosetting varnish and impregnation and cure of the epoxy-styrene resin, will have strands containing electrically contacting carbon particles. The carbon particles will have interiors substantially free of the varnish and epoxy-styrene resin. The binding tape will have a resistance value of below about 15,000 ohms/sq., and in some instances, with higher filled varnish content, will have resistance values of between about 1,000 to 5,000 ohms/sq. This provides a final semiconducting binding tape that is extremely effective to prevent corona in the slot portions of motors and other electrical apparatus and which resists epoxy-styrene degradation.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
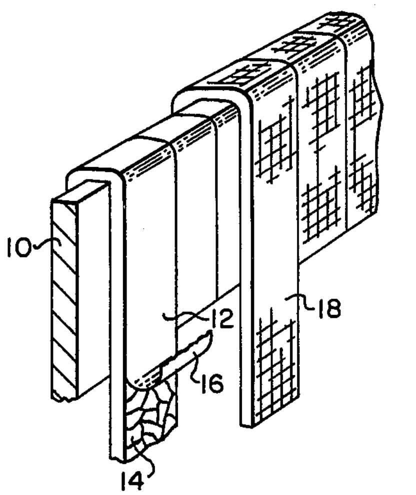
FIG. 1 is a fragmentary view in perspective, showing part of a copper coil wound with mica tape and semiconducting bonding tape in accordance with this invention.

Referring now to FIG. 1 of the drawings, coil member 10, shown as a single conductor strap of copper or aluminum, for instance, is wrapped with an overlapping layer of mica insulation tape 12. The insulation tape 12 may comprise mica flakes 14 and a sheet backing 16, all united with a resin. The tape may be applied half-lapped, butted or otherwise. One or more additional layers of mica tape, similar to tape 12 may be applied.

To impart better abrasion resistance and to secure a tighter insulation, as well as to reduce the possibility of corona discharge within the slot portions of the magnetic core in an electrical machine; an outer wrapping of a semiconducting, porous binding tape 18 may be applied to the coil. The binding tape strands will contain a carbon filled, modified alkyd thermosetting varnish. The carbon particles are protected by the varnish. The carbon particles are in contact with each other, are uniformly and homogeneously distributed through the varnish, and make the strands of the tape electrically semiconducting.

In a high voltage A.C. motor, the coil member may comprise a plurality of strands of round or rectangular conductors, each strand of the conductor consisting essentially of a copper or aluminum strap wrapped with strand insulation. The strand insulation 11 shown in FIG. 2, would be disposed between the conductor straps 10 and the mica tape 12, and would generally be prepared from a fibrous sheet or strip impregnated with a cured resinous insulation.

While the strand insulation may consist solely of a coating of uncured varnish or resin, it is preferred that it comprise a wrapping of fibrous material treated with a cured resin. Glass fiber cloth, paper asbestos cloth, asbestos paper or mica paper treated with a resin may be used with equally satisfactory results. The resin applied to the strand insulations may be a phenolic resin, an alkyd resin, a melamine resin or the like, or mixtures of any two or more of these. For more rigorous applications, a mica flake tape can be substituted for the above-described strand insulation wrappings around each of the conductors making up the coil in FIG. 2.

The strand insulation is generally not adequate to withstand the severe voltage gradients that will be present between the conductor and ground when the coil is installed in a high voltage A.C. motor. Therefore, ground insulation for the coil is provided by the mica tape 12, which bonds the entire coil together. The mica tape 12 for building coils in accordance with the present invention may be prepared from a porous sheet backing material upon which is disposed a layer of mica flakes. The porous sheet backing and the mica flakes are treated with liquid resin. The mica flakes are then preferably covered with another layer of porous sheet backing to protect the layer of mica flakes and to produce a more uniform insulation. This mica insulation is preferably in the form of a tape of the order of 1 inch in width though tapes or sheet insulation of any other width may be prepared.

For building electrical machines, the sheet backing for the tape may comprise paper, cotton fabrics, asbestos paper, glass cloth or glass fibers, or sheets or fabrics prepared from synthetic resins such as nylon, polyethylene and linear polyethylene terephthalate resins. Sheet backing material of a thickness of approximately 1 mil, to which there has been applied a layer of from 3 to 10 mils thickness of mica flakes has been successfully employed. The liquid resins used with the mica flakes can be linear polyesters or epoxy resins that are soluble in and compatible with the resinous compositions that will be employed in subsequently impregnating the coils.

Generally, a plurality of layers of the composite mica tape 12 are wrapped about the coil, with 16 or more layers being used for high voltage coils. While mica flake insulation is preferred as the ground insulation in high voltage machines, other types of mica containing insulation can be used for less rigorous applications. For example, mica paper, comprising small mica particles bound together in a paper making process can be used in place of the composite mica flake tape shown.

Figure 2:
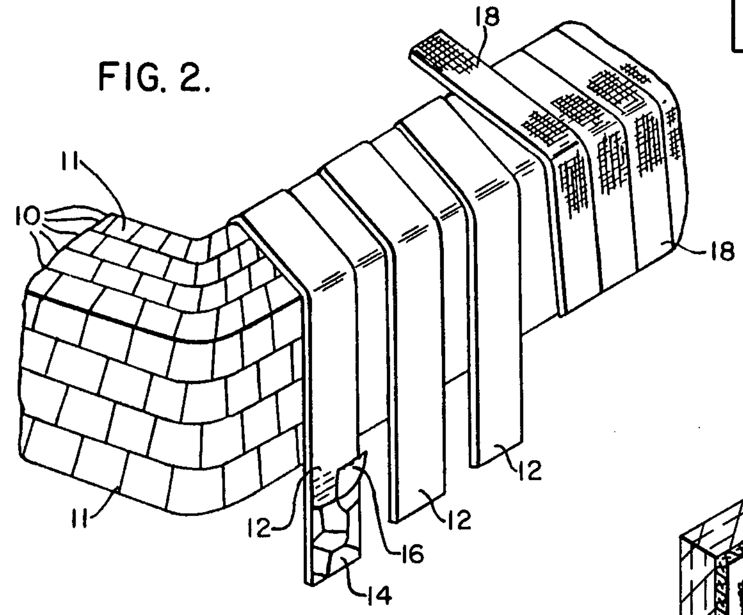
FIG. 2 is a fragmentary view in perspective, showing part of a high voltage coil comprising a plurality of strands of conductors wound with strand insulation, mica tape and the semiconducting binding tape of this invention.
Figure 3:
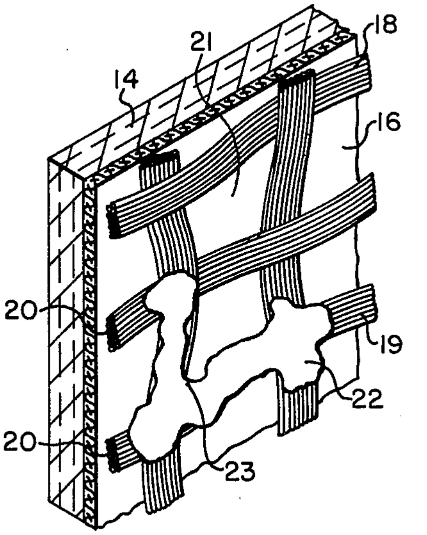
FIG. 3 is an enlarged fragmentary perspective view, showing the mica tape, covered with the binder coated porous binding tape of this invention.

The semiconducting binding tape of this invention is shown as 18 in FIGS. 1, 2 and 3. As shown in FIG. 3, the binding tape comprises a porous, oven weave substrate of natural or synthetic fabric cloth, for example cotton fabric, synthetic fabrics such as rayon, nylon, polyethylene, Orlon (synthetic acrylic), Dacron (polyethylene terephthalate), or preferably glass cloth. The fibrous strands 19 in FIG. 3 are preferably twisted single strands or are composed of a plurality of bunched fibers 20 as shown.

The open weave substrate should preferably have thread count of between about 40 to 90 threads/inch in the fill direction, and between about 40 to 90 threads/inch in the warp direction. Greater than about 90 threads in either direction will cause the varnish coating the tape strands to cover the open areas 21, between the strands 19, so that final vacuum impregnation with epoxy-styrene resin may be impeded. Less than about 40 threads in either direction will not provide sufficient binding strength for the coil, and may allow the electric charge to build up between the strands 19 and allow a corona discharge over the areas 21 from strand to strand.

The varnish used to coat the fibrous strands of the binding tape must be a resin capable of thermosetting, and able to resist the degrading effect of subsequent impregnation in epoxy-styrene resin at curing temperatures of about 150° to 250° C. As shown in FIG. 3, the varnish, containing uniformly distributed conducting carbon filler particles, coats and substantially permeates the strands 19 and substantially fills the voids or volume between the fibers 20 making up the strands 19 or within the twist of single strands. The coating may also completely cover the strands as shown at 22 and fill in some of the area between the strands as shown at 23, although it is highly desirable to only fill the voids or volume within the strands. Thus, each strand 19, when coated with the filled varnish, containing electrically conducting, contacting carbon particles, will become a semiconductor of electricity.

The styrene component used in the solventless impregnating resin has an extremely harmful effect on most other resin systems, acting as a solvent and causing swelling of most resin heretofore used in semiconducting binding tapes. This action is particularly critical here, where conducting carbon particles are dispersed through the binding tape strands 19, in a protecting varnish subject to attack all around the strand circumference.

Initially, the carbon particles are exposed to possible permeation by the varnish with loss of electrical conducting properties. After coating onto and within the strands and curing, the carbon comes under attack a second time from the epoxy-styrene resin. If the cured protective varnish is attacked by the styrene, the carbon particles then become exposed to the styrene. This exposure may allow styrene, or other components in the impregnating resin, to permeate the carbon. This second permeation makes the carbon much less conducting, and drastically reduces the corona resistance properties of the binding tape.

Epoxy resins and acid anhydrides also produce a degrading effect on most binding tapes, but to a much lesser degree than styrene. Since not only styrene, but also epoxy resin and acid anhydrides are used in the preferred impregnating resin, an especially resistant binding tape vehicle is required.

A suitable protective vehicle is a modified alkyd thermoset varnish composition. The preferred alkyd is a phenolic modified alkyd. This preferred composition resin will contain an admixture from 40 to 75% by weight of a phenolic resin and from 60 to 25% by weight of an alkyd resin.

The phenolic component of the preferred protective varnish is derived by admixing and heating to a temperature within the range of 70° C to reflux: (1) 1 mol of paratertiary butyl phenol, optionally containing small quantities of diphenylol-propane with (2) from 1.5 to 2 mols of an aldehyde selected from the group consisting of aqueous formaldehyde and polymers of formaldehyde in the presence of from 0.2 to 5%, based on the weight of the phenols, of an alkaline catalyst such as an alkali metal hydroxide, for example sodium hydroxide.

The reaction product is then rendered acidic with an acid, such as oxalic acid, phthalic anhydride, hydrochloric acid, sulfuric acid or phosphoric acid, to a pH of between 4 and 7. Water is then removed from the acidified reaction product by evaporation. The product then is maintained at a temperature in the range of 135° to 140° C until it has a ball and ring softening temperature of 100° C, after which maleinized linseed oil is added in such proportion that there is 12 to 25 gallons to 100 pounds of phenolic resin reaction product. The maleinized linseed oil may be prepared by reacting 100 parts by weight of linseed oil with from 3 to 8 parts by weight of maleic anhydride at 240° to 270° C and then adding a polyhydric alcohol such as glycerol, ethylene glycol, diethylene glycol, pentaerythritol and the like, in an amount to provide from 1 to 1.1 hydroxyl groups per mol of maleic anhydride, after which the mixture is heated at 200° to 270° C for several hours to esterify the carboxyl groups.

The oil modified phenolic resin is then mixed with a suitable aromatic or aliphatic organic solvent, for example, mineral spirits, naphtha, xylene, toluene, benzene and the like, to form a mixture containing about 50 to 65% by weight solids. This provides a "heat reactive phenolic resin, i.e. one, which can react with other polymers upon heating and will polymerize upon baking.

The alkyd component of the preferred binding tape resin is derived by admixing and heating to a temperature within the range of 200° to 240° C: (1) at least one dibasic acid selected from the group consisting of isophthalic and terephthalic acid, with (2) a carboxylic acid, including aromatic acids such as benzoic acid, phthalic acid, phenyl acetic acid, and aliphatic acids such as formic acid, acetic acid, propionic acid and caproic acid, with (3) an aliphatic polyhydric alcohol including any alcohol containing more than one hydroxyl group, for example glycerol, propylene glycol, trimethylene glycol, tetramethylene glycol, ethylene glycol and the like mixtures thereof, with (4) a drying oil including oils such as linseed oil, raw linseed oil, tung oil, oiticica oil and mixtures thereof, and (5) a catalyst effective to promote transesterification between the alcohol and the drying oil, for example litharge, calcium oxide, sodium ethylate and lithium recinoleate. In preparing the alkyd resin, the drying oil, the alcohol, the monobasic acid and catalyst are charged into a reaction vessel and heated to 240° C in an inert atmosphere, for example carbon dioxide, to get an esterification and a transesterification reaction. After the reaction has been carried substantially to completion, the mixture is cooled while being sparged with an inert gas, for example carbon dioxide, and then the dibasic acid is added.

The mixture of the initial reaction product and the dibasic acid is then heated slowly to about 240° C and the temperature maintained until the mixture has an acid number of from 4 to 15, preferably from 8 to 10. The reactants are employed in such proportions that the drying oil is added in an amount to provide a "medium" oil modified alkyd, i.e. the oil, constitutes from 40 to 55% by weight of the total weight of the alkyd resin.

The alkyd resin is then mixed with a suitable aromatic or aliphatic organic solvent, for example, mineral spirits, naphtha, xylene, toluene, benzene and the like to form a mixture containing about 50 to 65% by weight solids. The solution of oil modified phenolic resin and solution of alkyd resin are combined in the range described hereinabove. The preferred range is from 45 to 55% by weight of the phenolic and from 55 to 45% by weight of the alkyd.

The alkyd resin imparts flexibility and heat resistance and the phenolic resin imparts thermosetting properties and stability. Less than about 40% by weight phenolic resin in the binding tape composition would allow substantial degradation by styrene. Also, from 0.25 to 0.5% by weight of a dimethyl siloxane resin may be added to the phenolic-alkyd resin mixture to improve heat stability and improve coating properties.

It is to be understood that the term oil modified heat reactive phenolic-medium oil modified alkyd resin is descriptive of the protective varnish compositions described above. These materials have been used as insulating impregnating resins, and their method of production is described in U.S. Pat. No. 2,977,333 herein incorporated by reference.

It has been found that the above-described oil modified heat reactive phenolic-medium oil modified alkyd composition, containing at least about 40% by weight of phenolic component, has excellent resistance to styrene and epoxy resin swelling and dissolution when it is applied to an open weave substrate and cured to a completely thermoset condition for about ½ to 3 hours at about 150° to 250° C. It also acts as an effective adhesive or vehicle for the contacting, conducting, carbon particles uniformly dispersed therein.

Non-activated channel blacks and non-activated acetylene blacks are used as the conducting particles in the binding tape. These carbon blacks are generally in fluffy form. Channel carbon black is made by incomplete combustion of natural gas. It has a particle size of about 50 to 1300A diameter and a low resistivity.

Acetylene carbon black is made by thermal decomposition of acetylene. It has a particle size of between about 50 to 1300A diameter and a low resistivity. Microscopic examination shows the acetylene black carbons, the preferred carbon black material to be made of lace-like, needle-shaped electrical contact networks joining separated individual or small aggregates of particles of carbon. The fluffy channel and acetylene type carbon blacks have pore diameters generally below 20° A, and a total probable external and internal surface area below about 600 square meters per gram and generally between about 30 to 450 square meters per gram. They will not absorb either the phenolic-alkyd varnish or the epoxy styrene resin in such amounts to make them non-functional conductors, i.e. their interior will be substantially free of the resin and varnish.

The surface area can be found by the method of Brunauer, Emmett and Teller (BET), where the carbon is blanketed with a known quantity of absorbed gas, such as $N_2$. In this well known method, an absorption isotherm is plotted to yield a straight line in which the slope and intercept give the amount of $N_2$ gas required to form a monolayer on all the carbon external and internal surface. Knowing the probable area occupied by each molecule of $N_2$, the probable area of the absorbent can be calculated.

The channel and acetylene black carbons are very unlike pellet type "activated" carbon; where previously charred carbonaceous materials are heated to a high temperature in the presence of steam to form a solid carbon foam of very high interior surface area. Styrene-epoxy resin or phenolic-alkyd varnish would be much more likely to permeate the foamed "activated" carbon type material causing an insulating effect. "Activated" carbon particles have an overall diameter of between about 300,000 to 500,000 A, pore diameters in the range of between about 500 to 10,000 A and a total probable external and internal surface area of over about 600 square meters per gram.

The carbon filler content must be between about 15 to 45 weight percent based on filler plus varnish solids weight, i.e. filler + 100% varnish solids. Use of less than about 15 weight percent carbon will result in increasing resistance and lack of stability after the filled phenolic-alkyd coated binding tape is exposed to epoxy-styrene resin.

When less than about 15 weight percent carbon is used, the styrene-epoxy resin need only permeate a few of the contacting carbons to impair the circuit, so that the resistance value of the binding tape gradually increases to unacceptable levels. Use of more than about 45 weight percent carbon will result in a very viscous binding tape varnish which would be difficult to coat onto the porous support substrate. The carbon must of course be throughly mixed with the varnish binder to provide a homogeneous composition with uniform distribution of the connected or contacting carbon filler so that there is a good electrical connection or conduit through the varnish.

The filled varnish content of the binding tape should preferably be between about 15 to 40 weight percent based on filled cured varnish plus open weave substrate weight. When less than about 15 weight percent cured, filled binding tape varnish is used, the strands will not contain enough conducting carbon to prevent corona discharges. When greater than about 40 weight percent cured, filled binding tape varnish is used, the varnish will cover a great number of the areas between the strands, so that final vacuum impregnation with epoxy-styrene resin may be impeded. The filled varnish can be applied to the tape by brushing, spraying, dipping or any other suitable technique.

The phenolic-alkyd varnish must of course be cured for a time effective to substantially completely thermoset the varnish, so that it resists degradation by the epoxy-styrene resin. Usually between 30 to 180 minutes at between about 150° to 250° C, preferably between 175° to 225° C, is sufficient to thermoset the phenolic-alkyd varnish within the strands making up the open weave substrate of the binding tape, without exposing the carbon for too long a period to the liquid varnish.

The coils with the applied layers of mica insulation and coated semiconducting binding tape are placed into the slots of the electrical machine and the entire machine is then placed in an impregnating tank and the coils are vacuum impregnated, preferably with a liquid, epoxy-styrene resin for about 1 hour. After vacuum impregnation, the insulated coils are exposed to between about 45 to 100 psi of $N_2$ pressure for about 1 hour. The machine is then exposed to the atmosphere, and upon the application of heat a thermally stable, relatively flexible insulation is formed.

In the vacuum impregnation step, the electrical machine containing the coils is introduced into a vacuum impregnating tank and may be subjected to a heat drying and evacuating operating to remove substantially all moisture, air and other undesirable volatile material from the coils. The epoxy-styrene resin is then introduced into the tank until the electrical machine is completely submerged in the resin under vacuum for about 1 hour.

While the electrical machine containing the coils is completely covered with the polymerizable, epoxy-sytrene resin, atmospheric air or a gas such as nitrogen or carbon dioxide is introduced into the impregnating tank under pressure to assist the polymerizable resin in penetrating completely through the binding tape and into the interstices of the coils, and to assure substantially complete filing thereof.

The impregnating treatment need not be of long duration. One hour under pressure ordinarily is sufficient to completely impregnate and saturate small windings; longer impregnation periods, however, for example up to several hours or more, insure the most complete penetration and saturation of larger coils and windings. It will be understood that while vacuum pressure impregnation produces the best results, ordinary immersions under atmospheric conditions will give good results.

The electrical machine containing the impregnated but uncured coils is then withdrawn from the impregnating tank, drained briefly and subjected to a curing operation in an oven. The electrical machine is subjected to heat for a period of time of between about 8 to 16 hours at between 100° to 150° C to cure the epoxy-styrene resinous composition in the slot portions. It is also possible to impregnate the coils and cure them before introduction into the electrical machine, but this process presents problems of properly fitting the slot portions into the electrical machine.

Figure 4:
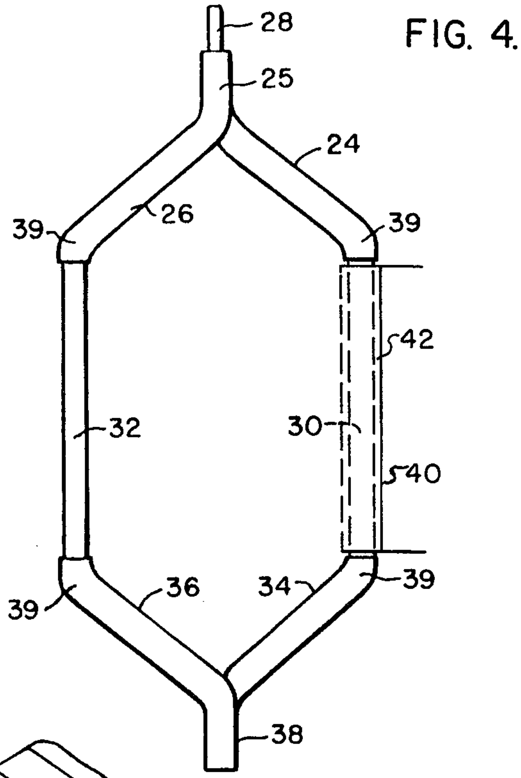
FIG. 4 is a plan view of a closed electrical coil member having two slot portions, one of which is in contact with a slot portion in the magnetic core of an electrical machine.

A closed full coil prepared in accordance with the present invention is illustrated in FIG. 4. The full coil has an end portion comprising a tangent 24, a connecting loop 25 and another tangent 26, with bare leads 28 extending therefrom. Slot portions 30 and 32 of the coil are formed to a predetermined shape and size. The slot portions are connected to the tangents 24 and 26 respectively. These slot portions are connected to other tangents 34 and 36 connected through another loop 38.

The slot portions 30 and 32 are covered with the semiconducting binding tape of this invention, and the tangents where they connect to the slot portions at 39 are coated with a conducting silicon carbide paint. The semiconducting binding tape of this invention contacts the slot wall of the electrical apparatus and provides a resistivity value well below 20,000 ohms/sq., and generally below 5,000 ohms/sq., to provide superior corona resistance.

Also shown in FIG. 4 is the slot wall 40 of the stator or rotor of an electrical machine. The insulated conductor assembly is fitted into the stator slots with a certain amount of clearance, resulting in gaseous spaces 42 between the outer surface of the coil and the stator laminations. Without a semiconducting tape, during operation of the machine, the intensity of the electrical field which would exist in these spaces 42 would be of a magnitude to allow discharges to occur. The breakdown of the air caused by the corona discharges would then form corrosive substances which would chemically erode the insulation. The formation of highly localized, highly intense heating also would contribute to the degradative process. By short circuiting the gaseous spaces with a semiconducting binding tape, superficial discharges in the straight part of the coil are eliminated.

By coating the strands of an applied binding tape with a suitable carbon filled phenolic-alkyd varnish, the above problem is solved. In this invention the strands are substantially saturated with the filled varnish and the strands provide a fiber matrix enclosing the filled varnish binder. This provides a binding tape where the strands, containing connected, conducting carbon particles disposed throughout the phenolic-alkyd varnish adhesive, become somewhat conductive. The coil is inserted into the stator or rotor cavity so that the semiconducting strands of the binding tape physically contact the slot wall at two or more contact points. The voltage, with respect to earth, existing at the surface of the coil and the assembly of earthed stator laminations, is kept below the breakdown voltage of any gaseous gap that may exist between coil surface and coil laminations. Thus the gaseous gaps do not ionize.

The epoxy-styrene impregnating resin preferred as the resinous insulation in the coils of this invention, will contain, in admixture: (1) the product of the reaction of (a) 1 part of an epoxy resin mixture comprising solid epoxy resin having an epoxy equivalent weight of between about 390–2500 and liquid epoxy resin having an epoxy equivalent weight of between about 100–385, wherein the weight ratio of solid epoxy: liquid epoxy is between 1:1 to 1:10; with (b) between about 0.01 to 0.06 part of maleic anhydride and (c) between about 0.0001 to 0.005 part of a catalyst selected from the group consisting of piperidine, pyridine, imidazoles, and preferably aliphatic tertiary amines; under such conditions that the reaction between the maleic anhydride and the epoxy resin mixture is substantially complete, and the epoxy diester formed has an acid number of between about 0.5 to 3.0; with (2) about 0.05 to 3 parts styrene, and between about 0.00030 to 0.004 part of an aromatic acidic phenolic compound, selected from the group consisting of dinitrophenols and trinitrophenols and mixtures thereof, preferably picric acid; and finally with (3) between about 0.3 to 1.2 part of a polycarboxylic anhydride, preferably NADIC methyl anhydride, which is soluble in the mixture of (1) and (2) at temperatures between about 0° to 35° C, and an amount of free radical catalyst, generally about 0.01 to 0.001 part, selected from azo compounds and peroxides, such as 1-tert-butylazo-1-phenylcyclohexane and 2,5-dimethyl-2,5 bis(benzoyl peroxy) hexane, that is effective to provide a catalytic effect on the impregnating varnish to cure it at temperatures over about 85° C. Upon heating at a temperature over about 85° C, the impregnating composition cures to a thermoset resin.

Epoxy-styrene resins are well known in the art for use as impregnating resins for electrical coils. The preferred epoxy-styrene resin described hereinabove, and its method of production, is described in U.S. Pat. No. 3,919,348 herein incorporated by reference.

EXAMPLE 1

A protective varnish composition was first prepared. About 520 parts of linseed oil (alkali refined), about 167 parts of glycerol (98%), about 68 parts of benthal (85% benzoic acid and 15% phthalic acid), and about 0.5 part of litharge were charged into a closed reaction vessel equipped with an agitator, thermometer, and inert gas sparging tube. A carbon dioxide atmosphere was established in the flask. The mixture is heated to a temperature of about 240° C and this temperature is maintained for about 1 hour while the mixture was being agitated. The mixture then was cooled to about 200° C while being sparged with carbon dioxide, and about 352 parts of isophthalic acid (98%) was added.

The resultant mixture was then heated slowly to a temperature of about 240° C and this temperature was maintained until the resultant mixture had an acid number of about 9. The mixture was then cooled to approximately 200° C, and mixed with xylene to form a solution comprised of about 60% by weight solids. This provided the medium oil modified (40–55 wt%) alkyd component of the binder.

Then, into a closed reaction vessel provided with a reflux column and an agitator there was introduced: about 266 parts of paratertiary butyl phenol, about 58 parts of Bis-phenol A, about 25.8 parts of Formalin (37%) and about 1.3 parts of sodium hydroxide.

The reaction vessel was heated until refluxing started at atmospheric pressure, and heating under reflux was continued for about 1.5 hours. The resulting condensation product was cooled to about 80° C and about 2.8 parts of sulfuric acid (35%) was added to reduce the pH of the mixture to about 5. The mixture was agitated for approximately 15 minutes more, and then the composition was allowed to stand to permit separation of a resinous layer from an aqueous layer. The aqueous layer was removed and the resinous layer was subjected to vacuum distillation to remove substantially all the water therefrom. The vacuum distillation was continued until a temperature of 130° C for the mass was reached at a pressure of about 20 mm of mercury.

Thereafter, the vacuum was broken and further polymerization of the resin was carried out under atmospheric pressure and a temperature of between 130° and 140° C until a softening point of approximately 100° C was obtained by the shall and ring method.

Approximately 510 parts of maleinized linseed oil was added and the mixture heated to 150° C. The mixture was then mixed with xylol so that the resulting mixture was comprised of 60% solids. This provided the oil modified heat reactive phenolic component of the binder.

Equal parts of the alkyd and phenolic components were thoroughly mixed to provide a solution containing 50 wt% of each component. The viscosity, Demmler #1, was about 100–300 seconds at 25° C and the percent solids were between about 53 to 63 wt%.

To 100 gram samples of this varnish composition were added: 6, 12 and 18 grams of fluffy acetylene black carbon (sold under the tradename Shawinigan by Shawinigan Products Corp.), consisting primarily of substantially discrete, connected particles, having a particle size diameter between about 200 to 1000 A, and having a total external and internal surface area of between 60–70 square meters/gram. Almost all of its surface area is external, so that it has a low porosity. It contained about 99.3% carbon and 0.6% volatiles, and had a low resistivity of about 0.035 to 0.05 ohm/cu. inch, making it an excellent electron conductor.

The carbon black was thoroughly mixed with the varnish composition samples in a ball mill for 24 hours, to provide filled, homogeneous varnish compositions: (A) with 10 wt% carbon based on carbon + 100% binder solids, i.e. 6 gram/100 gram (60% solids), (B) with 20 wt% carbon, and (C) with 30 wt% carbon respectively uniformly distributed through the composition.

An epoxy-styrene solventless impregnating resin was prepared. A two component epoxy resin system was first made by mixing about 3.25 parts of a solid low melting diglycidyl ether of bisphenol A, having an epoxy equivalent weight of about 475–575, a purity of about 99.5%, and a Durran's melting point of about 70–80% (sold commercially by Dow Chemical Company under the tradename DER-661) with about 6.75 parts of a liquid diglycidyl ether of bisphenol A, having an epoxy equivalent weight of about 180–200 and a viscosity of between 10,000–16,000 cps at 25° C (sold commercially by Jones-Dabney Company under the Tradename Epi-Rez 510). The resins were well blended, and the ratio of solid epoxy to liquid epoxy was 1:2.1.

The resins were then heated to 90° C. Then, to the 10 parts of combined solid-liquid epoxy resin was added about 0.375 part of maleic anhydride of about 99.5% purity and about 0.004 part of benzyl dimethyl amine as a catalyst. The catalyzed epoxy anhydride was held at 90° C for about 6 hours, to substantially completely react all of the maleic anhydride, and effect a reaction to the complete epoxy diester stage. The acid number of the epoxy diester formed was about 2.5, indicating substantially complete reaction, i.e. about 0.1% maleic anhydride left unreacted.

About eight parts of styrene vinyl monomer was mixed with about 0.0070 part picric acid (containing 10% water 0.0063 part picric acid) to be used as a room temperature reacting inhibitor. The epoxy diester was allowed to cool to about 60° C, and then the styrene-picric acid mixture was added and stirred in. The inhibited liquid epoxy diester-styrene mixture was allowed to cool to 25° C and the viscosity was measured to be about 200 cps at 25° C.

To this inhibited epoxy diester-styrene mixture about 5.49 parts of NADIC methyl anhydride and about 0.048 part of 2,5-dimethyl-2,5 bis(benzoyl peroxy) hexane catalyst (sold by Wallace & Tiernan Inc. under the Tradename of Luperox 118) were added, as a final step, at 25° C, to provide the solventless epoxy-styrene impregnating resin. The viscosity of the epoxy-styrene impregnating resin was measured to be about 200 cps at 25° C.

Samples (A), (B) and (C) of the filled varnish compositions were single brush coated and sample (B') was double brush coated onto 2.5 × 0.5-inch strips of style 116 fiberglass cloth. This glass cloth had 60 threads/inch in the warp direction, 58 threads/inch in the fill direction and a thickness of about 0.004 inch. It weighed 3.16 ounces/sq. yard and was a plain weave of individual S twisted strands, where each individual strand spirals around its central axis.

The filled varnish binding compositions flowed into the strands of the glass cloth and completely permeated the voids and volume within the S twist of the strands. Excess varnish was removed by passing a knife edge across the coated tape. The samples were then cured in an oven for 60 minutes at 200° C. The samples were then weighed to determine the wt% of cured filled varnish in the glass cloth.

The comparative purposes, a 2.5 × 0.5-inch strip of semiconducting tape, containing between about 15 to 55 wt% cured, carbon filled, acrylonitrile latex on style 116 fiberglass cloth was also used. This material had a filler content of between about 10 to 20 wt% and was designated Sample (D).

Each 2.5 × 0.5-inch coated, cured strip was attached to the probes of a Triplet Model 630-APL Type 3 Volt-Ohm Meter, by means of clips, and the resistance measured across the sample. Initial measurements of resistivity were taken in air. Then, the cured samples were formed into a U-shape, dipped into a 25° C bath of the epoxy-styrene impregnating resin described above, and measurements of resistivity taken in the bath for screening evaluation. The samples exhibited the following electrical properties, shown in Table 1, below, where sheet resistivity is reported in terms of ohms/square, which is a nondimensional measurement well known in the art.

TABLE 1

| Sample coated on cloth | Sample content of cloth | Filler content of sample | Resistivity Value: ohms/square Minutes in Epoxy-Styrene 25° C | | | |
|---|---|---|---|---|---|---|
| | | | 0 (In Air) | 5 | 20 | 300 |
| (A) | 19.9 wt % | 10 wt % | 2,600 | 9,600 | 9,600+ | — |
| (B) | 20.3 wt % | 20 wt % | 1,300 | 1,300 | 1,300 | 2,000 |
| (B') 2 coats | 33.8 wt % | 20 wt % | 400 | 400 | 400 | — |
| (C) | 20.7 wt % | 30 wt % | 1,300 | 1,300 | 1,300 | — |
| (D) control | 19–21 wt % | 10–20 wt % | 1,300 | — | 4,300 | 120,000 |

Coated and cured samples (B), (B') and (D) were then subjected to simulated manufacturing conditions with the epoxy-styrene impregnating resin described above at 100° C cure and 150° C postcure temperatures, and measurements of resistivity taken. The samples were dipped in a bath of epoxy-styrene resin and then placed in ovens to achieve the desired temperature cure and postcure. The samples exhibited the following electrical properties, shown in Table 2, below, measured after dipping, cure and postcure of the epoxy styrene varnish.

TABLE 2

| Sample coated on cloth | Resistivity value: ohms/square Hours Epoxy-Styrene at Temperature | | |
|---|---|---|---|
| | 25° C 5 Hr. | 100° C 8 Hr. | 150° C 8 Hr. |
| (B) | 13,000 | 13,000 | 12,000–13,000 |
| (B') 2 coats | 3,000 | 3,000 | 3,000 |
| (D) control | 120,000 | 120,000 | 120,000 |

Filled, varnish composition sample (B) was single coated on style 116 glass cloth as described above and subjected to various cure times at 200° C, before being dipped in a bath of the epoxy-styrene impregnating resin described above. The samples exhibited the following electrical properties, shown in Table 3 below:

TABLE 3

| Sample coated on cloth | Minutes cure at 200° C | Resistivity value: ohms/square Minutes in Epoxy-Styrene 25° C | | |
|---|---|---|---|---|
| | | 0 (In Air) | 5 | 20 |
| (B) | 10 | 1,300 | 14,000 | 14,000+ |
| (B) | 20 | 1,300 | 1,300 | 5,000 |
| (B) | 30 | 1,300 | 1,300 | 1,800 |
| (B) | 60 | 1,300 | 1,300 | 1,300 |

The data indicates that the carbon filled varnish of this invention, having less than about 30 minute curing times or less than about 15 wt% filler content, provide unacceptably high resistivity values, which would not adequately protect against corona discharges in the slot portions of electrical machines.

With less than 30 minute cure, the phenolic component of the varnish binder had not set enough to effectively resist styrene attack. With less than about 15 wt% filler, the styrene successfully permeated just enough conducting carbon chains within the varnish to open some circuits and increase the resistance to an unacceptable level.

Sample (B) and especially double coated sample (B') showed especially good resistivity values: initially, with 1,300 and 400 ohm/square in air, see Table 1; and after simulated epoxy-styrene resin motor impregnation of 5 hours in air, 8 hours at 100° C and 8 hours at 150° C with about 13,000 and 3,000 ohm/square respectively, versus a value of 120,000 ohm/square for the control sample containing a carbon filled acrylonitrile latex composition, see Table 2.

The cured filled varnish coated tapes were porous, and the data indicates that the carbon particles used were not easily permeated by the phenolic-alkyd varnish and retain their electrical conductivity after coating and cure. The conductivity is adjustable by the amount of carbon black used. Other type carbons having total internal and external surface areas below about 600 square meters/gram should be equally resistive to initial and secondary permeation by the varnish and resin respectively thus remaining electrically conductive.

High voltage coils were prepared similar to those shown in FIG. 2 of the drawings, where about 5 windings of mica tape, having a polyethylene terephthalate backing, was disposed between the conductors and the semiconducting bonding tape of this invention. The wrapped coils were successfully used in 7,000–10,000 kv A.C. motors without corona discharge after testing.

EXAMPLE 2

As a comparative example, the same procedure was followed and the same materials used as in Example 1, to make cured, coated sample (B), only in this instance an "activated" carbon (sold under the tradename Nuchar C-1000N by W. Va. Pulp and Paper Co.) was substituted for the acetylene black. The filler content was 20 wt% and the carbon had a total internal and external surface area of about 1,100 square meters/gram. This sample was cured in an oven for 60 minutes at 200° C, connected to the Triplet Volt-Ohm Meter, dipped into a 25° C bath of the epoxy-styrene varnish described in Example 1 and measurements of resistivity taken. This sample, designated sample (E) exhibited the following electrical properties shown in Table 4, below:

TABLE 4

| Sample coated on cloth | Filler content of sample | Resistivity value: ohms/square Minutes in Epoxy-Styrene 25° C | | | |
|---|---|---|---|---|---|
| | | 0 (In Air) | 5 | 20 | 60 |
| (E) "activated" carbon | 20 wt % | 50,000 | 85,000 | 142,000 | 317,000 |

Comparing this data with that of sample (B) in Table 1, indicates that only a particular type of carbon will provide good corona resistance, which is inversely related to the resistivity value i.e. the higher the resistivity value the lower will be the corona resistance of the tape. It is believed that the "activated" carbon absorbed some of the phenolic-alkyd varnish, and absorbed some of the curing agent component of the varnish so that the phenolic component did not cure properly and the varnish and carbon were then subject to styrene attack even though a full cure cycle was used for the varnish. As can be seen there is a factor of over 100 times increased resistivity at 20 minutes in room temperature styrene for "activated" carbon i.e. those over about 600 square meters/gram total internal and external surface area.

I claim:

1. An insulated electrical member, comprising at least one conductor wrapped with mica insulation and covered with a semiconducting binding tape, the whole being impregnated with a cured epoxy-styrene resin; wherein the binding tape comprises a porous, open weave substrate of electrically semiconducting fibrous strands; the fibrous strands coated with between about 15 to 40 weight percent of a carbon filled, completely thermoset, styrene resistant, protective varnish composition, the protective varnish composition consisting essentially of a cured, heat reactive phenolic alkyd admixture of 40 wt% to 75 wt% of a phenolic component and 60 wt% to 25 wt% of an alkyd component; said varnish composition containing between about 15 to 45 weight percent of electrically contacting carbon particles having a total internal and external surface area of up to about 600 square meters/gram, uniformly distributed therethrough, the interior of the carbon being substantially free of the varnish and resin, to provide fibrous strands that conduct electricity, said impregnated binding tape having a resistivity value of up to about 15,000 ohms/square.

2. The insulated electrical member of claim 1 wherein the fibrous strands have a thread count of between about 40 to 90 threads in the warp and fill direction.

3. The insulated electrical member of claim 2 wherein the varnish composition is a cured admixture of: (A) a phenolic component consisting essentially of effective amounts of: (1) paratertiary butyl phenol (2) aldehyde and (3) maleinized linseed oil, and (B) an alkyd component consisting essentially of effective amounts of: (1) dibasic acid selected from the group consisting of isophthalic acid and terephthalic acid (2) carboxylic acid (3) aliphatic polyhydric alcohol (4) drying oil and (5) catalyst effective to promote transesterification between the alcohol and the drying oil, wherein the drying oil constitutes from 40 wt% to 55 wt% of the total weight of the alkyd component.

* * * * *